(12) United States Patent
Tamenaga

(10) Patent No.: US 8,033,940 B2
(45) Date of Patent: Oct. 11, 2011

(54) SPEED REDUCER

(75) Inventor: Jun Tamenaga, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 852 days.

(21) Appl. No.: 11/889,124

(22) Filed: Aug. 9, 2007

(65) Prior Publication Data
US 2008/0045369 A1  Feb. 21, 2008

(30) Foreign Application Priority Data
Aug. 10, 2006  (JP) .................... 2006-218206

(51) Int. Cl.
*F16H 57/04* (2010.01)
(52) U.S. Cl. ...................................... 475/159
(58) Field of Classification Search .......... 475/159
See application file for complete search history.

(56) References Cited

U.S. PATENT DOCUMENTS

| | | | |
|---|---|---|---|
| 6,991,574 B2 * | 1/2006 | Martin, III | 475/159 |
| 7,357,745 B2 * | 4/2008 | Hidaka et al. | 475/159 |
| 2001/0044356 A1 * | 11/2001 | Takeuchi et al. | 475/178 |
| 2002/0155915 A1 * | 10/2002 | Tanaka | 475/162 |
| 2003/0054912 A1 * | 3/2003 | Nohara et al. | 475/162 |

FOREIGN PATENT DOCUMENTS

| | | |
|---|---|---|
| DE | 2256150 | 5/1974 |
| DE | 102004055121 | 5/2006 |
| DE | 102005055567 | 6/2007 |
| JP | 9-57678 | 3/1997 |
| JP | 2001-323972 | 11/2001 |
| JP | 2002-302233 | 10/2002 |

* cited by examiner

*Primary Examiner* — Sherry L Estremsky
*Assistant Examiner* — Erin D Bishop
(74) *Attorney, Agent, or Firm* — Squire, Sanders & Dempsey (US) LLP

(57) ABSTRACT

A speed reducer that can fundamentally eliminate the cause of lubricant leakage is provided. A speed reducer that reduces the speed of input rotation includes at least a first space and a second space separated by an oil seal, and the first space and the second space are each put with lubricant. A level of the lubricant put in the first space is set to be higher than a level of the lubricant put in the second space, and the level of the lubricant put in the second space is set to be at or lower the level of a lowermost oil seal among oil seals that separate the second space and the exterior of the speed reducer.

9 Claims, 3 Drawing Sheets

SPEED REDUCER

BACKGROUND OF THE INVENTION

1. Field of the Invention

The present invention relates to a speed reducer that reduces the speed of input rotation and outputs the reduced rotation.

2. Description of the Related Art

Conventionally, a geared motor GM1 illustrated in FIG. 3 is known (see Japanese Patent Laid-Open Publication No. 2001-323972). The geared motor GM1 is composed of a motor M1 and a speed reducer G1 connected together.

The motor M1 is secured on a motor fixture 2, which is secured on a first carrier 11 by a bolt 21. A connection shaft 3, on which a pinion 4 is formed, is connected by a key to a motor axis 1 of the motor M1. This pinion 4 is in mesh with a gear 5. The gear 5 is integrally connected to a rotating axis 6 so as to rotate together. An eccentric body 7 is integrally formed on the rotating axis 6. The eccentric body 7 can oscillatingly rotate an external gear (a planetary gear) 9 with an eccentric body bearing 8 interposed therebetween. The external gear 9 is also in mesh with an internal gear 10. The number of teeth of the external gear 9 and that of the internal gear 10 are chosen such that the difference between the two is very small. The internal gear 10 also serves as a casing of the speed reducer G1 and is disposed and secured on a base 16 by bolts 19. The first carrier 11 is supported by a bearing 13 to rotate with respect to the internal gear 10. The first carrier 11 has an integrally formed carrier pin 11A. The carrier pin 11A is inserted with some play in a carrier pin hole 9A of the external gear 9. A second carrier 12 is connected to the carrier pin 11A by a bolt 15. This second carrier 12 is supported by a bearing 14 to rotate with respect to the internal gear 10. In other words, the first and second carriers 11 and 12 can rotate together as a whole with respect to the internal gear 10.

The base 16 has a flange 16A formed so as to extend inward, and a hollow pipe 17 is secured to the flange 16A by bolts 18. The hollow pipe 17 penetrates the center of the speed reducer G1 so that wires or the like 20 can be laid through.

In the speed reducer G1 provided to the geared motor GM1, a part at the highest level that requires lubrication is a part where the pinion 4 and the gear 5 are in mesh. Then, if the speed reducer G1 is to be lubricated with a liquid lubricant, the lubricant needs to fill at least to this meshed part of the pinion 4 and the gear 5 (level indicated by the A-A line, for example).

The speed reducer G1 has a space within itself that is formed by the base 16, the flange 16A, the hollow pipe 17, the first carrier 11, an oil seal 22, and the internal gear 10, and a lubricant can be accommodated in this space.

However, if, as mentioned above, the lubricant is poured up to the part that requires lubrication and is at the highest elevation (the A-A level), the possibility that the lubricant leaks from the oil seal 22 will increase. In other words, since the lubricant level (the A-A level) is higher than a level of the oil seal 22, the oil seal 22 is constantly subjected to a pressure (a pressure from the interior to the exterior of the speed reducer) corresponding to the "difference" in level.

SUMMARY OF THE INVENTION

The present invention was made in order to solve this problem, and an object thereof is to provide a speed reducer that can fundamentally eliminate the cause of lubricant leakage.

The present invention is a speed reducer that reduces the speed of input rotation and has the following structure to solve the above-mentioned problem. The speed reducer includes at least a first space and a second space separated by oil seals, the first space and the second space each being put with a lubricant. Furthermore, a level of the lubricant put in the first space is set to be higher than a level of the lubricant put in the second space, and the level of the lubricant put in the second space is set to be at or lower a top position of a lowermost oil seal among oil seals which separate the second space and an exterior of the speed reducer, the lowermost oil seal being disposed at the lowermost position among the oil seals.

When configuring the speed reducer as described above, the lowermost oil seal that forms the second space can be prevented from being subjected to a large pressure, compared to the case where a lubricant is poured to a prescribed level of the first space without separating the space. Furthermore, since only a necessary amount of lubricant needs to be poured to a part where the lubricant is required, an amount of lubricant that the device uses as a whole can be reduced.

The application of the present invention can eliminate the cause of lubricant leakage. Furthermore, an amount of lubricant to be used can be reduced.

DETAILED DESCRIPTION OF THE PREFERRED EMBODIMENTS

Hereinafter, one example of an exemplary embodiment of the present invention will be described with reference to the attached drawings.

Figure 1:
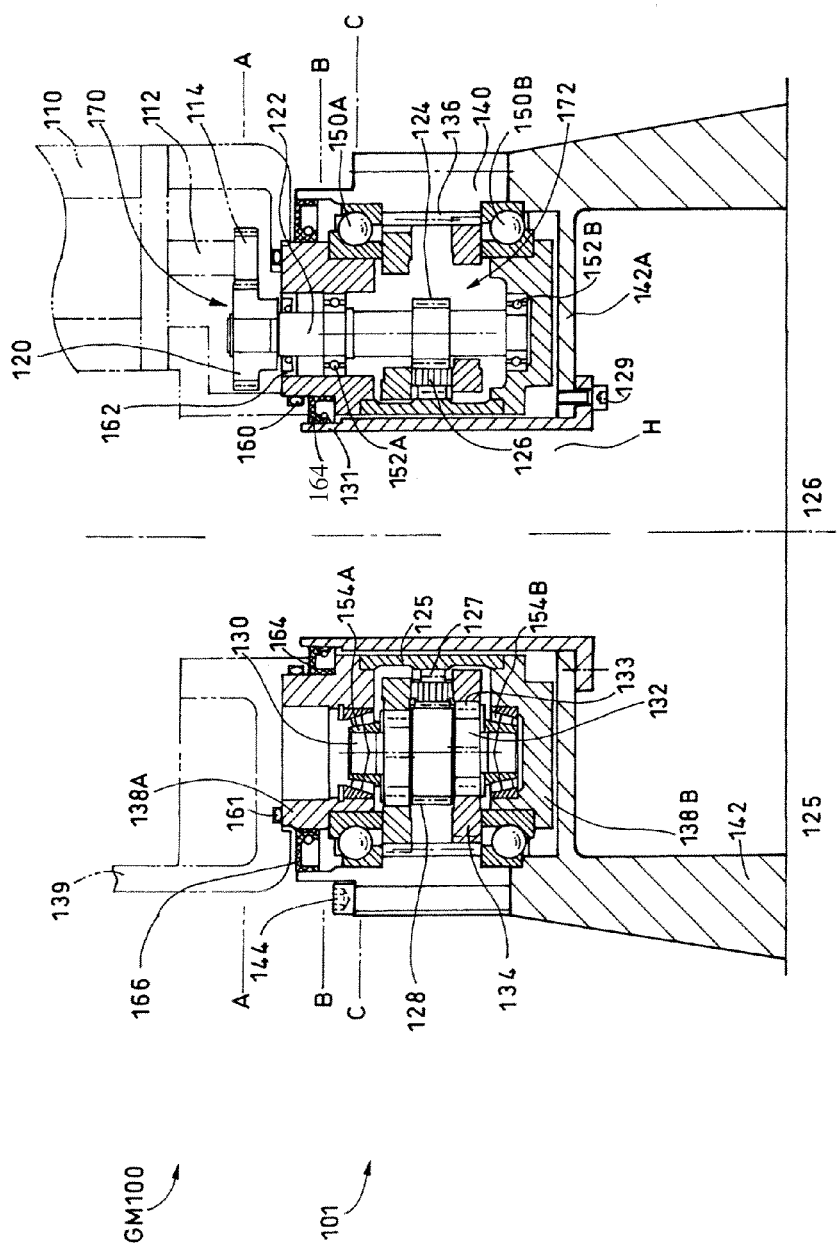
FIG. 1 is a cross-sectional view of the geared motor GM100, illustrating one example of an exemplary embodiment of the present invention.
Figure 2:
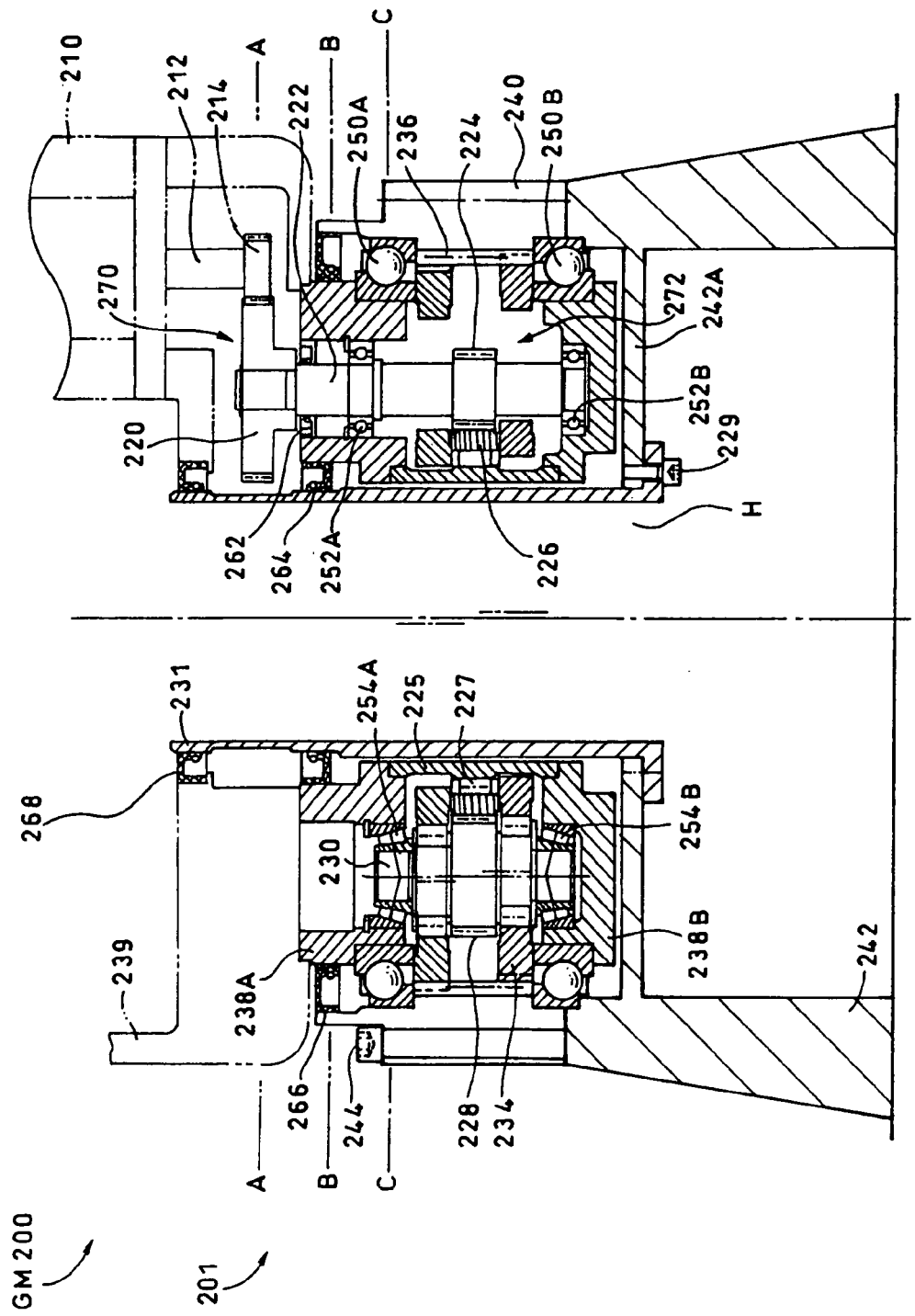
FIG. 2 is a cross-sectional view of the geared motor GM200, illustrating one example of other exemplary embodiments of the present invention.
Figure 3:
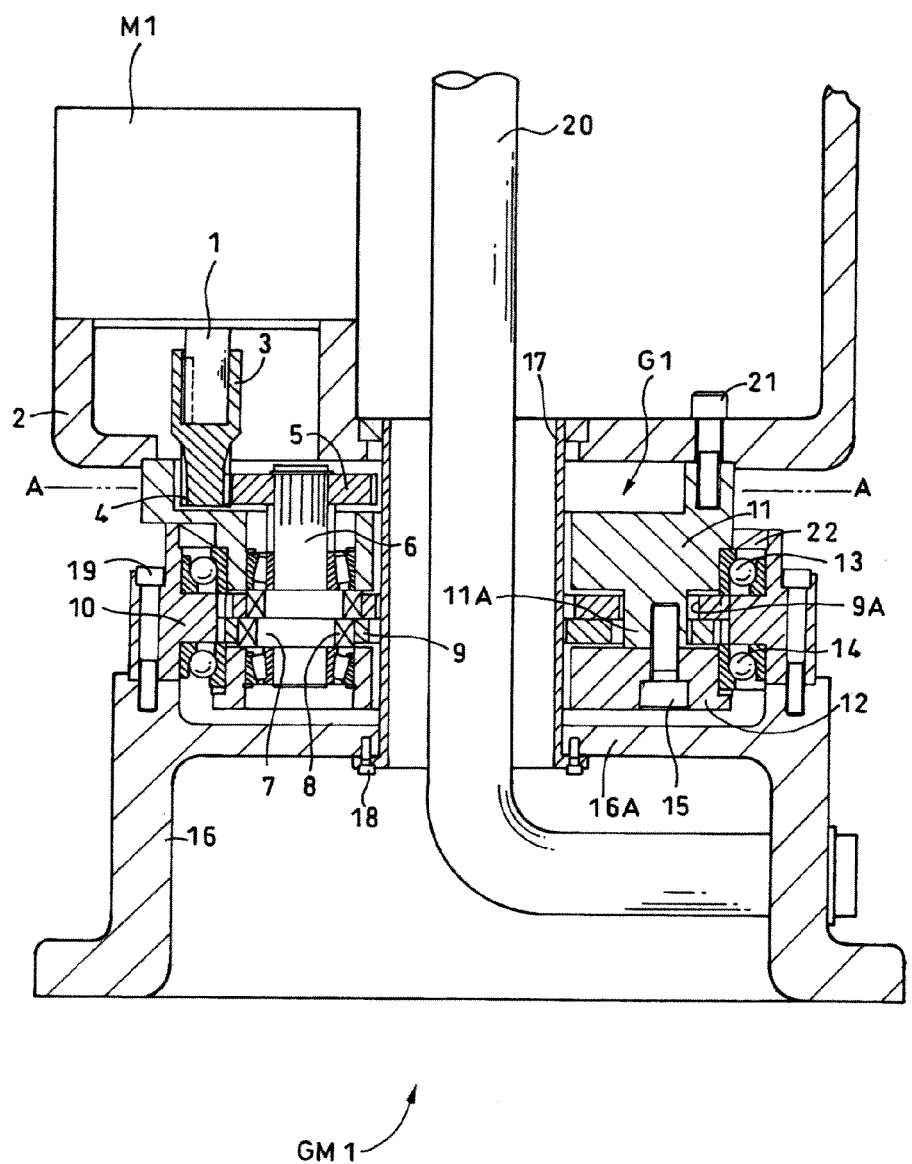
FIG. 3 is a cross-sectional view of the geared motor GM1 described in Japanese Patent Laid-Open Publication No. 2001-323972.

FIG. 1 is a side cross-sectional view of a geared motor GM100, illustrating one example of the exemplary embodiment of the present invention. In FIGS. 1 and 2, the centerline running through the center of geared motor GM100 (GM200) defines, in this embodiment, a vertical axis. Items that are described as being top or upper are to be interpreted as being axially left, toward the upper side of the Figures. Items that are described as being bottom or lower are to be interpreted as being axially right, toward the lower side of the Figures.

In other words, when the geared motor GM100 (GM200) is placed so that its axis lies in a vertical orientation, a base 142 (242) is arranged downward or toward the bottom of the geared motor, and a motor 110 (210) is arrange above the base, with respect to the vertical orientation. Items that are described as being higher with respect to the vertical orientation are to be interpreted as being axially left. Items that are described as being lower with respect to the vertical orientation are to be interpreted as being axially right.

A geared motor GM100 is composed of a motor 110 as a power source and an oscillating internally meshing planetary gear speed reducer 101. The geared motor GM100 is so called a "vertical" geared motor, in which its axis lies in a vertical direction. The motor 110 is disposed on a top face of a casing 140 that houses a speed reducing mechanism with a motor fixture 139. A base 142 is coupled to the casing 140 on the bottom face of the casing 140 by a bolt 144. Furthermore, the geared motor GM100 has a hollow part H at the radial center, so that cables and the like can be laid through the hollow part H.

The hollow part H is formed inside of a cylindrical flange 131 that penetrates first and second carriers 138A and 138B. This cylindrical flange 131 is fixed to a flange 142A of the base 142 by a fixture bolt 129.

The cylindrical flange 131 is made of a thin material since the cylindrical flange 131 does not directly contribute to power transmission. Consequently, the radius of the hollow part H can be formed to be large.

A motor shaft 112 of the motor 110 is provided with a pinion 114 so as to rotate integrally (at constant speed) with the motor shaft 112. This pinion 114 may, for example, be directly machined on the motor shaft 112 or be a separate gear member fixed on the motor shaft 112. This pinion 114 is in mesh with an input gear (an input member) 120 whose radius is larger than that of the pinion 114. In other words, the input gear 120 is larger than the pinion 114, thereby constituting a primary reduction stage (a first reduction stage) of the speed reducer. The input gear 120 is fixed to an input shaft 122. The input shaft 122 is disposed to penetrate the first carrier 138A and an external gear 134. The input shaft 122 is supported by the first carrier 138A through an input shaft bearing 152A, and is supported by the second carrier 138B through an input shaft bearing 152B.

An input shaft gear 124 is integrally formed with the input shaft 122 at a middle position of the input shaft 122 in the axial direction (between the input shaft bearings 152A and 152B supporting the input shaft 122). This input shaft gear 124 is in mesh with a distribution gear 126. The distribution gear 126 is supported by the carrier 138 through a distribution gear bearing 127 and an in-carrier cover 125.

At positions not overlapping with the input shaft 122, three eccentric body shafts 130 are disposed with a mutual phase difference of 120° (only one of them appears in FIG. 1). An eccentric body shaft gear 128 is formed at a middle position of each eccentric body shaft 130 in the axial direction, and is in mesh with the above-mentioned distribution gear 126.

Eccentric bodies 132 having mutually different directions of eccentricity are integrally formed with the eccentric body shaft 130 immediately above and below the eccentric body shaft gear 128, that is, on both sides in an axial direction of the eccentric body gear 128. Furthermore, each eccentric body 132 is fitted in (a hollow part of) the external gear 134 with an eccentric body bearing 133 interposed therebetween.

The external gear 134 has a hollow part which fits the eccentric body 132 through the eccentric body bearing 133. The external gear 134 is in mesh with pin-shaped internal teeth 136. The number of the pin-shaped internal teeth 136 is set to slightly differ from that of the external gear 134 (approximately by one to four). In the present embodiment, the internal teeth 136 and the casing 140 constitute an internal gear.

Each eccentric body shaft 130 is supported by the first carrier 138A through an eccentric body shaft bearing 154A, and further, supported by the second carrier 138B through an eccentric body shaft bearing 154B.

The carrier 138 is composed of the first carrier 138A on the top side and the second carrier 138B on the bottom side, which are integrally coupled by a carrier pin and a carrier bolt to be connected to the carrier pin (not illustrated in the figure). The in-carrier cover 125 is provided on the inner side (cylindrical flange 131 side) of the first carrier 138A and the second carrier 138B, so as to connect the first and second carriers 138A and 138B. Moreover, the first and second carriers 138A and 138B are supported the casing 140 through carrier bearings 150A and 150B.

A first oil seal 162 is provided on the above-mentioned input shaft 122 above the input shaft bearing 152A (as seen in FIG. 1) to seal between the first carrier 138A and the input shaft 122. With this first oil seal 162, an upper space (a first space) 170 defined by the first oil seal 162, the first carrier 138A, and the motor fixture 139 is formed. This upper space 170 is put with a lubricating oil (lubricant) of a necessary amount to lubricate the meshing portion between the pinion 114 and the input gear 120 (for example, to the A-A level in FIG. 1).

Furthermore, a second oil seal 164 is disposed between the first carrier 138A and the cylindrical flange 131. A third oil seal 166 is disposed between the first carrier 138A and the casing 140. These second and third oil seals 164 and 166 separate the interior and the exterior of the speed reducer 101. Moreover, (the lip of) the second oil seal 164 is positioned lower than (the lip of) the third oil seal 166. By arranging the second and third oil seals 164 and 166, together with the above-mentioned first oil seal 162, a lower space (a second space) 172 is formed below the upper space 170 of the speed reducer 101. More specifically, the lower space 172 is defined by the base 142, the flange 142A (of the base 142), the cylindrical flange 131, the second oil seal 164, the first carrier 138A, the first oil seal 162, the third oil seal 166, and the casing 140. The lower space 172 is also put with the lubricant. In the present exemplary embodiment, an amount of the lubricant put in the lower space 172 is determined by the following two condition. The first condition is, a lubrication required part which is positioned at the highest level within the lower space 172 can be lubricated (the lubrication required part is a part including, for example, the carrier bearing 150A and the eccentric body bearing 154A: the C-C level). The second condition is, even if the lubricant put in the upper space 170 were poured into the lower space 172 (due to a failure of the first oil seal 162 for example), the oil level of the lower space 172 would not reach a level of the lip (the B-B level) of the second oil seal 164. The second oil seal 164 is the oil seal arranged at the lowest position among oil seals that separate the lower space (second space) 172 and the exterior of the speed reducer 101. Regarding the input shaft bearing 152A that supports the input shaft 122 against the first carrier 138A, a sealed bearing can be used to provide self-lubrication.

Next, functions of the geared motor GM100 will be described.

When the motor 110 is actuated, rotation of the motor shaft 112 is transmitted to the input gear 120 through the pinion 114. In this instance, since the radius of the input gear 120 is larger than that of the pinion 114, rotation of the motor shaft 112 is reduced in speed and transmitted to the input shaft 122. When the input shaft 122 rotates, so does the input shaft gear 124, and the distribution gear 126 that is in mesh with the input shaft gear 124 rotates as well.

Furthermore, since the distribution gear 126 is in mesh with the three eccentric body shaft gears 128, power transmitted from the input shaft 122 is simultaneously distributed to each of the eccentric body shafts 130. Rotation of the distribution gear 126 causes each eccentric body shaft 130 to rotate. Since each eccentric body shaft 130 is provided with the eccentric body 132, the eccentric body 132 makes eccentric rotation, which causes the external gear 134 to oscillatingly rotate. When this happens, since the external gear 134 is in mesh with the internal teeth 136 the number of which is slightly different from that of external teeth, the external gear 134 makes almost only the oscillation motion with very small rotation about its own axis. Since this oscillation component is absorbed by the eccentric bodies 132, only a small component of rotation of the external gear 134 is transmitted to the carrier 138 as an output.

In the present exemplary embodiment, since the casing 140 is fixed on the base 142, an action of the geared motor GM100 causes the whole carrier 138 including the motor 110 to rotate.

In the present exemplary embodiment, the interior of the speed reducer 101 is divided into the upper space 170 and the lower space 172 by the first oil seal 162, and both the spaces 170, 172 are put with a prescribed amount of the lubricant. Accordingly, since, upon separating the interior of the speed reducer as mentioned above, it only needs to put each space with a required amount of lubricant, the total amount of the lubricant to be used can be reduced. Furthermore, it is possible to use a lubricant with the most appropriate property to each space (viscosity or the like). Furthermore, an amount of the lubricant put in the lower space 172 is determined (by above second condition) such that, even if the lubricant put in the upper space 170 were poured into the lower space 172, the oil level would not reach a level of the lip (the B-B level) of the second oil seal 164. Since the second oil seal 164 is the oil seal arranged at the lowest position among oil seals that separate the lower space (second space) 172 and the exterior of the speed reducer 101, all oil seals including the second oil seal 164 are not subjected to a pressure (an oil pressure) even if the lubricant within the upper space 170 enters the lower space. Apparently, it would not subjected to a pressure at all if the lubricant does not enter. In other words, even if the first oil seal 162 fails, the lubricant put in the upper space 170 merely flows into the lower space 172. Furthermore, even if the second and third oil seals 164 and 166 fail, the lubricant level within the second space 172 does not reach a level of (the lips of) those oil seals 164, 166, and the lubricant does not leak. As a result, even if oil seals used in the speed reducer 101 fail either totally or partially, the lubricant put inside does not leak to the outside.

As in the present exemplary embodiment, it is preferable that a lubricant level within the lower space 172 be set at or lower the lip level of the lowermost oil seal in the lower space 172 (or more preferable that it do not reach the bottom level of the lowermost oil seal) even in the case where the lubricant flows into the lower space 172 from the upper space 170. However, for example, even in the case where the lubricant level within the lower space 172 becomes higher than the level of the lip of the lowermost oil seal when the lubricant flows into the lower space 172, as long as a lubricant level within the lower space 172 is set to be at or lower the top position of the lowermost oil seal, an appropriate result can be obtained. In other words, even if an oil seal that separates the upper space 170 and the lower space 172 fails, it is unlikely that the lubricant put in the upper space 170 flows into the lower space 172 in a short time. Therefore, there would be some time until the lowermost oil seal is subjected to a large pressure, and a detection before leakage is possible through, for example, periodical inspections or the like (the same is true in other exemplary embodiments to be described later). Furthermore, even in the case where almost all the lubricant within the upper space 170 flows into the lower space 172, a load of pressure on the lowermost oil seal can be maintained small when compared to the case where a lubricant is filled to a prescribed level in a portion of the space corresponding to the upper space from the start with no separation being provided by an oil seal.

Although, in the above-described embodiment, the number of spaces separated by oil seals is two, there may be three or more separated spaces (the same is true in another embodiment to be described later).

Next, one example of other exemplary embodiments of the present invention will be described with reference to FIG. 2.

FIG. 2 is a side cross-sectional view of a geared motor GM200, illustrating one example of other embodiments of the present invention. Parts that are identical or similar to those of the above-described geared motor GM100 are indicated by reference numerals whose last two digits are the same, and descriptions of the same structures and functions will be omitted.

In the geared motor GM200, the second oil seal 264 is provided to separate the upper space 270 and the lower space 272 instead of separating the interior and the exterior of the speed reducer. That is, the cylindrical flange 231 serves to define not only the second space 272 but also the first space 270. More specifically, the upper space 270 is defined by the motor fixture 239, the fourth oil seal 268, the cylindrical flange 231, the second oil seal 264, the first carrier 238A, and the first oil seal 262. On the other hand, the lower space 272 is defined by the cylindrical flange 231, the second oil seal 264, the first carrier 238A, the first oil seal 262, the third oil seal 266, the casing 240, the base 242, and the flange 242A (of the base 242).

Here again, an amount of the lubricant put in the lower space 272 is determined by the following two condition. The first condition is, a lubrication required part which is positioned at the highest level within the lower space 272 can be lubricated (the lubrication required part is a part including, for example, the carrier bearing 250A and the eccentric body bearing 254A: the C-C level). The second condition is, even if the lubricant put in the upper space 270 were poured into the lower space 272 (due to a failure of the first oil seal 262 and/or the second oil seal 264 for example), the oil level would not reach a level of the lip (the B-B level) of the third oil seal 266. The third oil seal 266 is the oil seal arranged at the lowest position among oil seals that separate the lower space (second space) 272 and the exterior of the speed reducer 201. Therefore, the third oil seal 266 is not subjected to a pressure (an oil pressure) even if a lubricant within the upper space 270 enters the lower space. Apparently, it would not subjected to a pressure at all if lubricant does not enter. In other words, even if the first or second oil seal 262 or 264 fails, the lubricant put in the upper space 270 merely flows into the lower space 272. Furthermore, even if the third oil seal 266 fails, the lubricant level within the second space 272 does not reach a level of (the lip of) this oil seal, and the lubricant does not leak. As a result, even if oil seals used in the speed reducer 201 fail totally or partially, the lubricant put inside does not leak to the outside.

Although the speed reducer of the above-described geared motor is an eccentric oscillation-type planetary gear speed reducer, the present invention is not limited to any particular type of speed reduction mechanism when the present invention is applied. For example, a simple planetary gear speed reducer may be used, where a component of orbital motion of the planetary gears is transmitted to the carrier as an output.

If the present invention is applied, for example, to speed reducers that are instrumental in realizing turning motions of industrial robots, shutdown of those robots (and, consequently, of the production line) due to oil leakage can be suitably avoided.

The disclosure of Japanese Patent Application No. 2006-218206 filed Aug. 10, 2006 including specification, drawing and claim are incorporated herein by reference in its entirety.

What is claimed is:

1. A speed reducer for reducing a speed of input rotation comprising:
    a first oil seal that separates an interior space of the speed reducer into at least a first space and a second space each being put with lubricant; and
    a second oil seal that separates the second space and an exterior of the speed reducer; wherein
    a level of the lubricant put in the first space is set to be axially left of a level of the lubricant put in the second space, and
    the level of the lubricant put in the second space is set to be axially even with or axially right of an axially leftmost position of the second oil seal.

2. The speed reducer according to claim 1, wherein the level of the lubricant put in the second space is set such that the level is axially even with or axially right of the axially leftmost position of the second oil seal even when a portion of the lubricant put in the first space would flow from the first space into the second space if the first oil seal were absent.

3. The speed reducer according to claim 1, wherein the level of the lubricant put in the second space is set to be axially even with or axially right of a lip position of the second oil seal.

4. The speed reducer according to claim 1, wherein the level of the lubricant put in the second space is set such that the level does not reach an axially rightmost position of the second oil seal.

5. The speed reducer according to claim 1, further comprising:
    a first speed reduction unit disposed in the first space;
    a second speed reduction unit disposed in the second space, the second speed reduction unit including a planetary gear and a carrier which synchronizes with a rotational or orbital component of the planetary gear; and
    a rotating shaft for transmitting power from the first speed reduction unit to the second speed reduction unit, wherein
    the first oil seal is disposed between the rotating shaft and the carrier.

6. The speed reducer according to claim 1, further comprising:
    a first speed reduction unit disposed in the first space;
    a second speed reduction unit disposed in the second space, the second speed reduction unit including a planetary gear and a carrier which synchronizes with a rotational or orbital component of the planetary gear; and
    a hollow member penetrating the speed reducer, wherein
    the first oil seal is disposed between the hollow member and the carrier.

7. The speed reducer according to claims 5, further comprising an internal gear with which the planetary gear internally meshes, wherein
    the second oil seal is disposed between the internal gear and the carrier.

8. The speed reducer according to claim 5, further comprising:
    a hollow member penetrating the speed reducer,
    wherein the second oil seal is disposed between the hollow member and the carrier.

9. The speed reducer according to claim 1, further comprising a third oil seal disposed at a position axially left of the second oil seal, the third oil seal separating the second space and the exterior of the speed reducer.

* * * * *